(12) United States Patent
Nakamura

(10) Patent No.: US 7,144,432 B2
(45) Date of Patent: Dec. 5, 2006

(54) METHOD OF MAKING CAPACITOR ELEMENT USED FOR SOLID ELECTROLYTIC CAPACITOR

(75) Inventor: Takahiro Nakamura, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 27 days.

(21) Appl. No.: 10/717,700

(22) Filed: Nov. 19, 2003

(65) Prior Publication Data

US 2004/0117959 A1    Jun. 24, 2004

(30) Foreign Application Priority Data

Dec. 20, 2002    (JP)    ............... 2002-369721

(51) Int. Cl.
*H01G 9/00*    (2006.01)
(52) U.S. Cl. ............ 29/25.03; 361/523; 361/525; 427/79; 427/80
(58) Field of Classification Search ............... 29/25.03; 361/523, 525; 427/79, 80
See application file for complete search history.

(56) References Cited

U.S. PATENT DOCUMENTS 5,776,633 A  *  7/1998  Mrotek et al. ........... 429/231.8
5,938,797 A      8/1999  Fujiwara et al.
5,938,798 A  *  8/1999  Hanawa et al. ............ 29/623.1
6,562,513 B1 *  5/2003  Takeuchi et al. ............ 429/189

FOREIGN PATENT DOCUMENTS

JP    7-22288    1/1995
JP    7-282802   * 10/1995

* cited by examiner

*Primary Examiner*—Alexander Ghyka
(74) *Attorney, Agent, or Firm*—Hamre, Schumann, Mueller & Larson, P.C.

(57) ABSTRACT

A method of making a capacitor element used for a solid electrolyte capacitor is provided. The method includes steps of forming a dielectric layer, a solid electrolyte layer of manganese dioxide, a graphite layer and a metal layer in this order on an anode chip of valve metal. The method further includes a step of forming an intermediate layer between the electrolyte layer and the graphite layer. The intermediate layer is made by application of manganese nitrate solution containing 0.5–2.0 wt % of graphite powder or by application of a graphite material containing manganese dioxide powder.

4 Claims, 9 Drawing Sheets

METHOD OF MAKING CAPACITOR ELEMENT USED FOR SOLID ELECTROLYTIC CAPACITOR

BACKGROUND OF THE INVENTION

1. Field of the Invention

The present invention relates to a method of making a capacitor element to be incorporated in a solid electrolytic capacitor which is produced with the use of a valve metal such as tantalum or niobium.

2. Description of the Related Art

A conventional capacitor element of the above-mentioned type is made in the following manner, for example.

First, powder of a valve metal, e.g., tantalum, is compressed and baked to produce an anode chip. Then, the anode chip is dipped into a chemical solution (e.g. an aqueous solution of phosphoric acid) for anodic oxidation. Thus, a highly insulating dielectric layer of tantalum pentoxide ($Ta_2O_5$) is formed on the metal particles of the anode chip. Then, a solid electrolyte layer of manganese dioxide ($MnO_2$) is formed on the $Ta_2O_5$-dielectric layer by dipping the anode chip into an aqueous solution of manganese nitrate and then baking the chip at 200–250° C. after taken out of the solution (this dipping and baking process may be repeatedly performed a number of times). Then, a graphite layer is formed on the $MnO_2$-electrolyte layer by dipping the anode chip into a graphite suspension and then drying the chip at 150–200° C. after taken out of the suspension (this dipping and drying process may also be performed repeatedly). Finally, a metal layer is formed on the graphite layer by application of a conductive paste. As a result, the cathode of the obtained capacitor element has a three-layer structure consisting of the solid electrolyte layer, the graphite layer and the metal layer.

In the above conventional capacitor element, the $MnO_2$-electrolyte layer and the overlapping graphite layer greatly differ in physical properties, in particular, have considerably different thermal expansion coefficients. Therefore, when heated (this may happen when the capacitor is soldered to a printed circuit board, for example), the electrolyte layer and the graphite layer tend to expand at different rates, thereby causing delamination therebetween. Unfavorably, this leads to the deterioration of the impedance characteristics of the capacitor device.

A remedy for the above problem is disclosed in Japanese patent application laid-open No. 7(1995)-22288, for example. Specifically, this prior art document teaches that the above-mentioned delamination can be prevented by forming an additional solid electrolyte layer between the $MnO_2$-electrolyte layer and the graphite layer with the use of a manganese dioxide material which contains 5–50 wt % of graphite powder.

According to the JP document, the intermediate graphite-containing electrolyte layer is formed in the following manner. First, a graphite-containing solution is prepared by adding an appropriate amount of graphite powder into an aqueous solution of manganese nitrate. Then, an anode chip (with the underlying $MnO_2$-electrolyte layer formed previously) is dipped into the graphite-containing manganese nitrate solution. Finally, the anode chip is taken out of the solution and baked.

In accordance with the teaching of the prior art document, the additional solid electrolyte layer should contain 5 wt % at least. To this end, 70 wt % of manganese nitrate solution and 30 wt % of graphite powder need to be mixed, as disclosed in the description of the embodiments.

The inventor of the present application conducted experiments and found that there is a drawback in the prior art method. As noted above, a large amount of graphite power (30 wt %) is added to the manganese nitrate solution for making the additional electrolyte layer, which contains at least 5 wt % of graphite powder. With such a high mixing rate, however, the resultant electrolyte layer tends to have a considerably rough surface to an extent that the irregularity cannot be satisfactorily smoothed out merely by overlapping the upper layers (i.e., the graphite layer and the metal layer). Accordingly, the obtained capacitor element does not look fine in appearance.

SUMMARY OF THE INVENTION

The present invention has been proposed under the circumstances described above. It is, therefore, an object of the present invention to provide a capacitor element fabrication method which can overcome the above problem.

According to a first aspect of the present invention, there is provided a method of making a capacitor element used for a solid electrolyte capacitor. The method includes the steps of forming, on an anode chip of valve metal, a dielectric layer, a first solid electrolyte layer of manganese dioxide, a graphite layer and a metal layer in this order. The method further includes the step of forming an intermediate solid electrolyte layer between the step of forming the first solid electrolyte layer and the step of forming the graphite layer. The intermediate solid electrolyte layer is formed by applying and sintering of a manganese nitrate aqueous solution containing 0.5–2.0 wt % of graphite powder.

According to a second aspect of the present invention, there is provided a method of making a capacitor element used for a solid electrolyte capacitor. The method includes the steps of forming, on an anode chip of valve metal, a dielectric layer, a solid electrolyte layer of manganese dioxide, a first graphite layer and a metal layer in this order. The method further includes the step of forming an intermediate graphite layer between the step of forming the solid electrolyte layer and the step of forming the first graphite layer. The intermediate graphite layer is formed of a graphite material containing manganese dioxide powder.

Preferably, the above step of forming the intermediate graphite layer may include the applying of a graphite solution that contains 5–10 wt % of manganese dioxide powder and the subsequent drying of the applied solution.

Other features and advantages of the present invention will become apparent from the detailed description given below with reference to the accompanying drawings.

DETAILED DESCRIPTION OF THE PREFERRED EMBODIMENTS

Preferred embodiments of the present invention will be described below with reference to the accompanying drawings.

FIGS. 1–12 illustrate a first embodiment of the present invention. According to the first embodiment, the following steps are performed for making a desired capacitor element.

Figure 1:
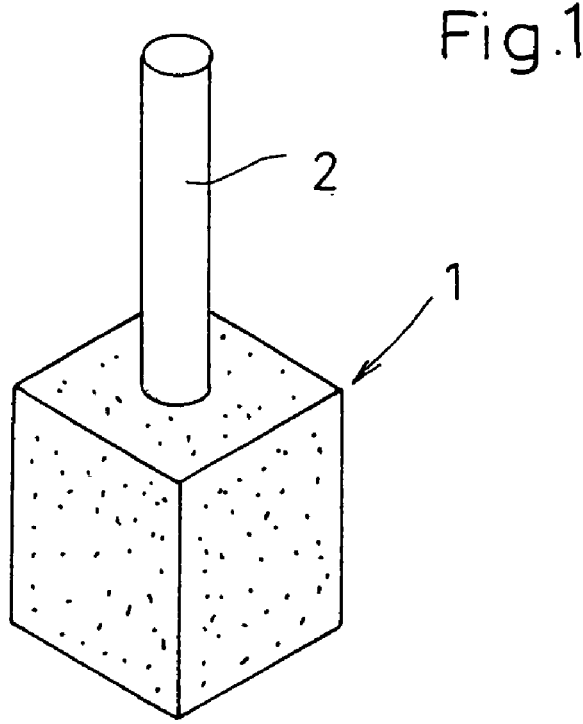
FIG. 1 is a perspective view showing an anode chip according to a first embodiment of the present invention.
Figure 2:
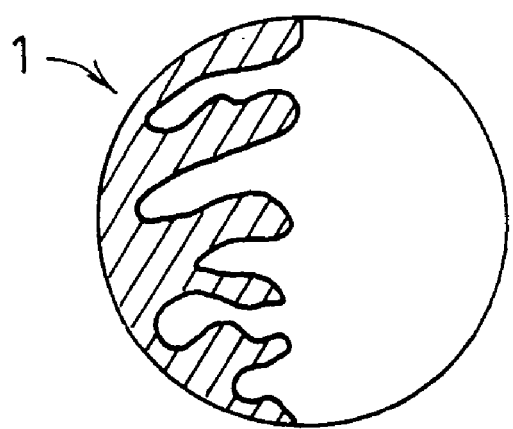
FIG. 2 is an enlarged sectional view showing the surface irregularities of the chip of FIG. 1.

Referring first to FIG. 1, a prescribed amount of tantalum powder is compacted into a chip and then the chip is sintered. Thus, a porous anode chip 1 is obtained (see also FIG. 2). As illustrated, an anode bar 2, made of tantalum, projects from one surface of the anode chip 1.

Figure 3:
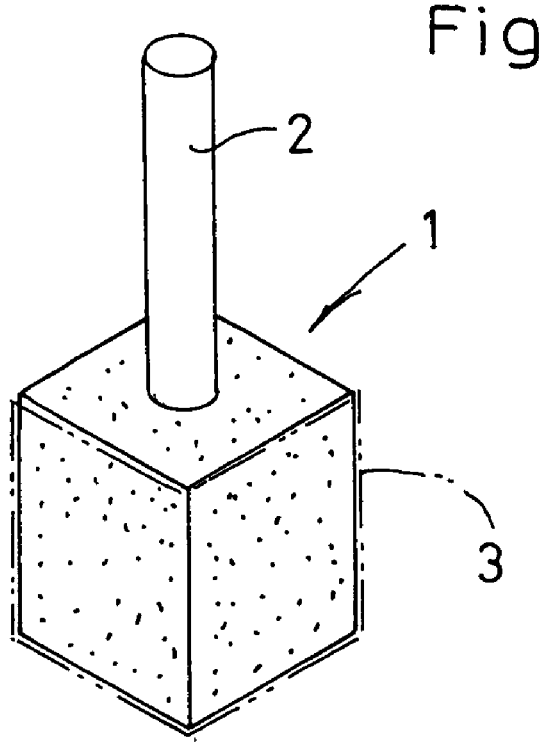
FIG. 3 is a perspective view showing the anode chip of the first embodiment, with a dielectric layer formed thereon.
Figure 4:
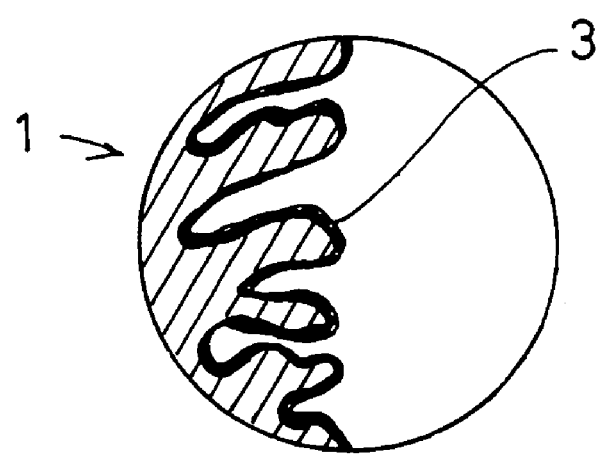
FIG. 4 is an enlarged sectional view showing the surface condition of the chip of FIG. 3.

Then, the anode chip 1 is immersed in a chemical solution such as an aqueous solution of phosphoric acid for anodic oxidation. Consequently, as shown in FIGS. 3 and 4, an insulating dielectric layer 3 made of tantalum pentoxide is formed on the metal particles of the anode chip 1.

Figure 5:
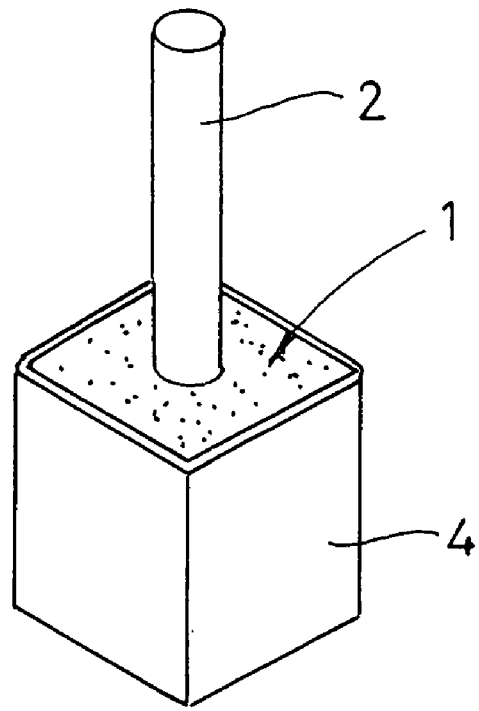
FIG. 5 is a perspective view showing the anode chip of the first embodiment, with a first electrolyte layer formed thereon.
Figure 6:
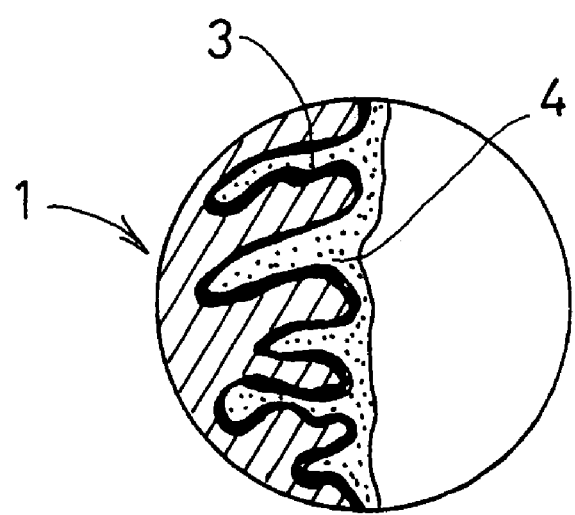
FIG. 6 is an enlarged sectional view showing the surface condition of the chip of FIG. 5.

Then, a solution of manganese nitrate is applied to the anode chip 1. To this end, the anode chip 1 is immersed in a $Mn(NO_3)_2$ solution. After taken out of the solution, the chip is baked at 200–250° C. for pyrolysis. This immersion and pyrolysis process is repeated a prescribed number of times. Consequently, as shown in FIGS. 5 and 6, a solid electrolyte layer 4 made of manganese dioxide is formed on the dielectric layer 3.

Figure 7:
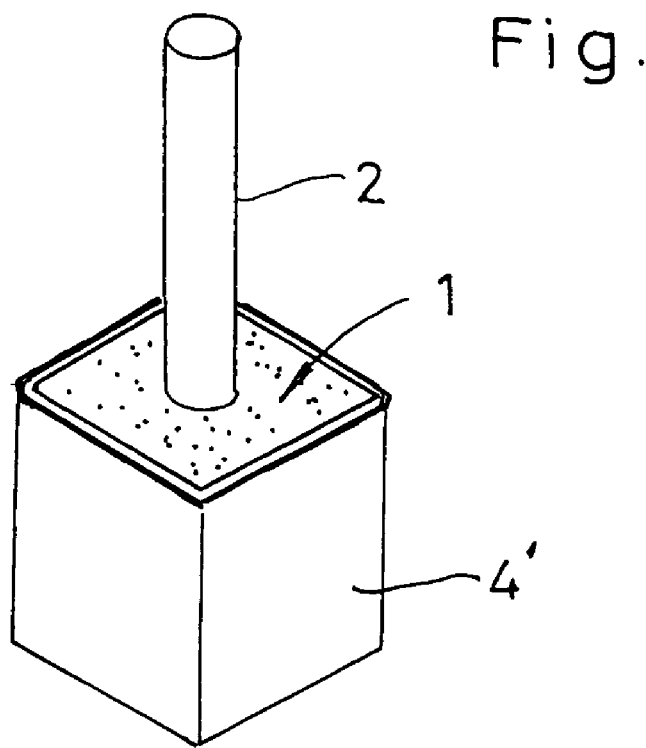
FIG. 7 is a perspective view showing the anode chip of the first embodiment, with a second or intermediate electrolyte layer formed thereon.
Figure 8:
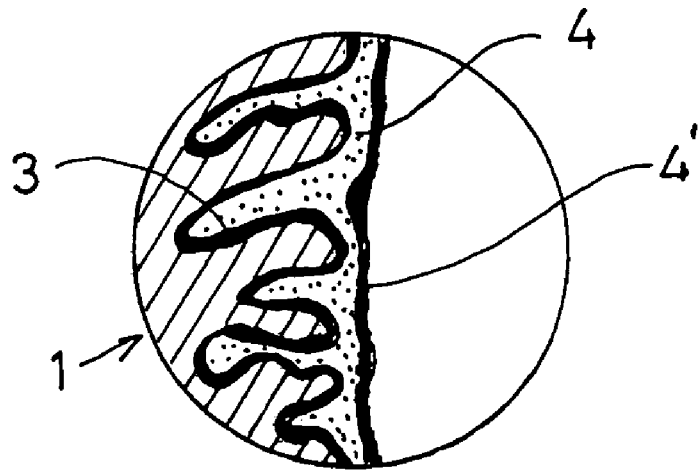
FIG. 8 is an enlarged sectional view showing the surface condition of the chip of FIG. 7.

Then, an aqueous solution of manganese nitrate is prepared so that the solution contains 0.5–2.0 wt % of graphite powder. The anode chip 1 is immersed in the thus prepared graphite-containing solution. After taken out of the solution, the anode chip 1 is baked at 200–250° C. for pyrolysis. This immersion and pyrolysis process is performed at least once, preferably two or three times. Consequently, as shown in FIGS. 7 and 8, a second or intermediate solid electrolyte layer 4', made of graphite-containing manganese dioxide, is formed on the first solid electrolyte layer 4.

Figure 9:
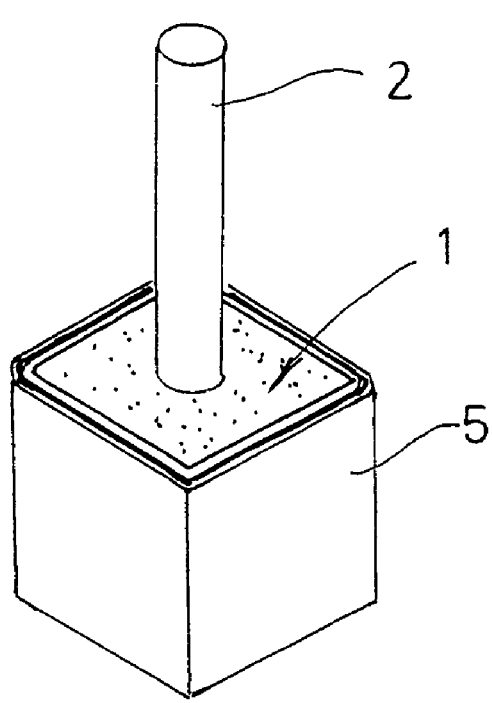
FIG. 9 is a perspective view showing the anode chip of the first embodiment, with a graphite layer formed thereon.
Figure 10:
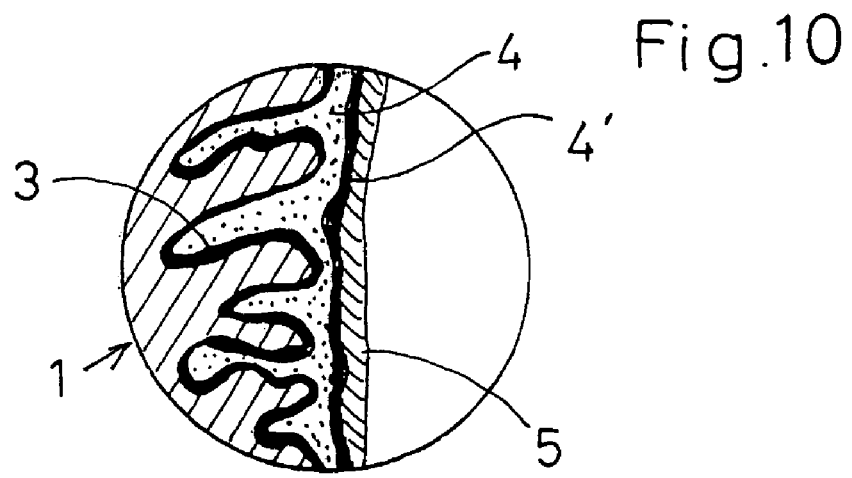
FIG. 10 is an enlarged sectional view showing the surface condition of the chip of FIG. 9.

Then, the anode chip 1 is immersed in a graphite solution containing graphite powder. After taken out of the solution, the anode chip 1 is heated at 150–200° C. for drying. This immersion and drying process is repeated a prescribed number of times. Consequently, as shown in FIGS. 9 and 10, a graphite layer 5 is formed on the second solid electrolyte layer 4'.

Figure 11:
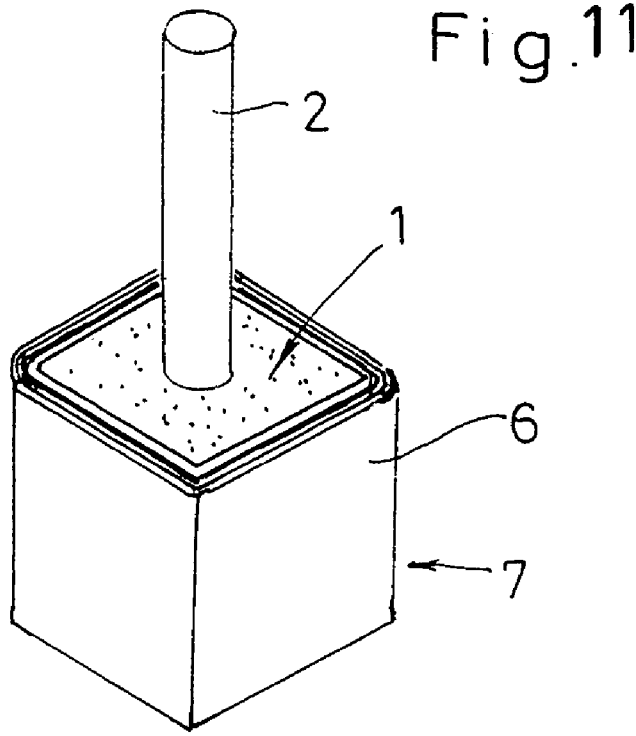
FIG. 11 is a perspective view showing the anode chip of the first embodiment, with a metal layer formed thereon.
Figure 12:
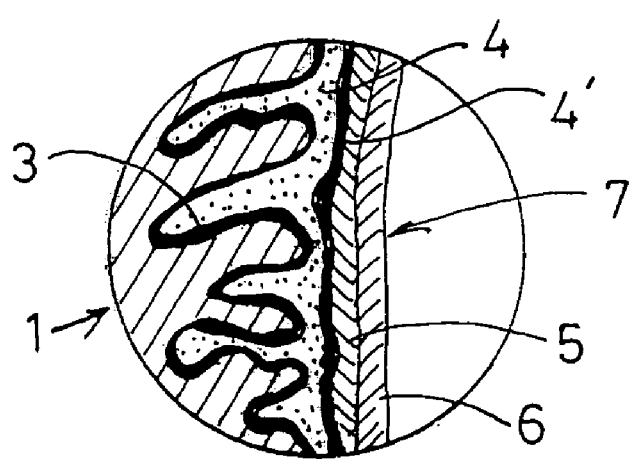
FIG. 12 is an enlarged sectional view showing the surface condition of the chip of FIG. 11.

Finally, a metal layer 6 is formed on the graphite layer 5, as shown in FIGS. 11 and 12, by application of a conductive paste, for example. Thus, a cathode 7 of the capacitor element is completed. The cathode 7 of the present invention has a four-layer structure consisting of the first electrolyte layer 4, the second (or intermediate) electrolyte layer 4', the graphite layer 5 and the metal layer 6.

As noted above, the intermediate electrolyte layer 4' contains graphite powder. Because of this, the layer 4' is rendered similar in thermal expansion rate (among other physical properties) to the first electrolyte layer 4 and the graphite layer 5 that are arranged to flank the layer 4'. With the similar expansion rates, the delamination between the layers 4 and 5 under heating condition only occurs much less frequently than when no such intermediate layer is provided.

An experiment conducted by the inventor has shown that the prevention of the delamination satisfactorily worked when the manganese nitrate solution contains 0.5 wt % or more of graphite powder. However, when the solution contains less than 0.5 wt % of graphite powder, substantially no successful prevention of the delamination was observed.

In the experiment, it was also found that the surface of the intermediate layer 4' became uneven when the manganese nitrate solution contained more than 2.0 wt % of graphite powder. In particular, when the graphite mixing rate was 3.0 wt % or more, the surface irregularities were too large to be smoothed out by forming the overlapping layers 5 and 6. In light of this, the maximum mixing rate of graphite powder in the manganese nitrate solution is preferably 2.0 wt %.

Reference is now made to FIGS. 13–18 illustrating a second embodiment of the present invention.

Figure 13:
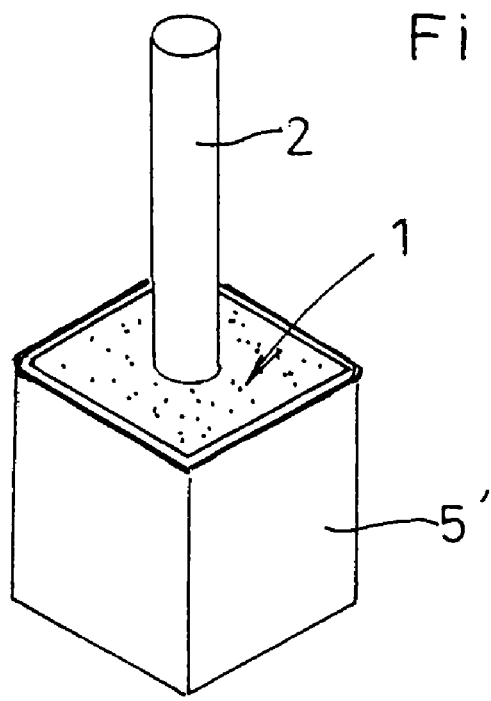
FIG. 13 is a perspective view showing an anode chip according to a second embodiment of the present invention, with a first or intermediate graphite layer formed thereon.
Figure 14:
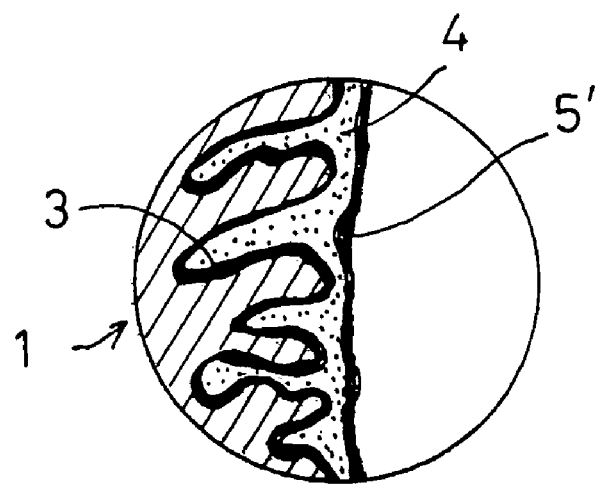
FIG. 14 is an enlarged sectional view showing the surface condition of the chip of FIG. 13.
Figure 15:
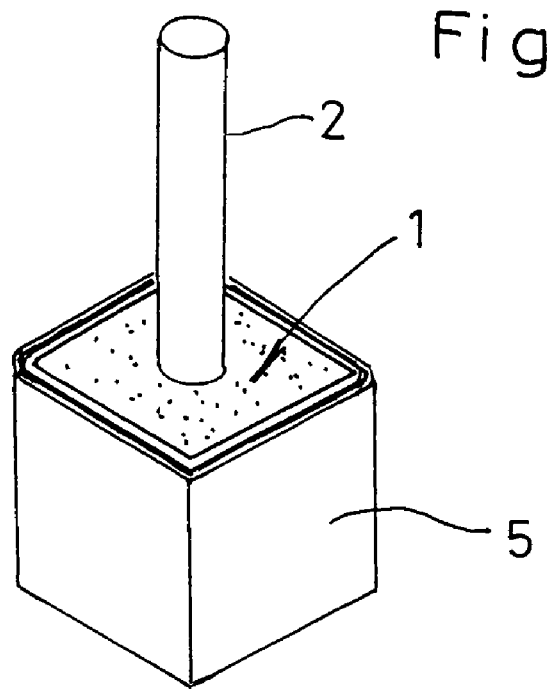
FIG. 15 is a perspective view showing the anode chip of the second embodiment, with a second graphite layer formed thereon.
Figure 16:
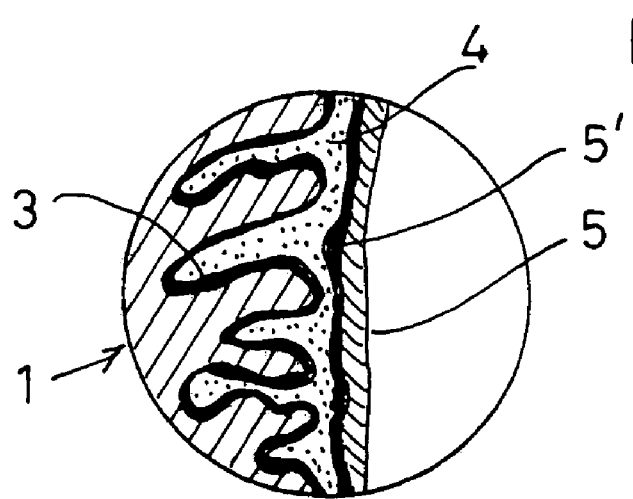
FIG. 16 is an enlarged sectional view showing the surface condition of the chip of FIG. 15.
Figure 17:
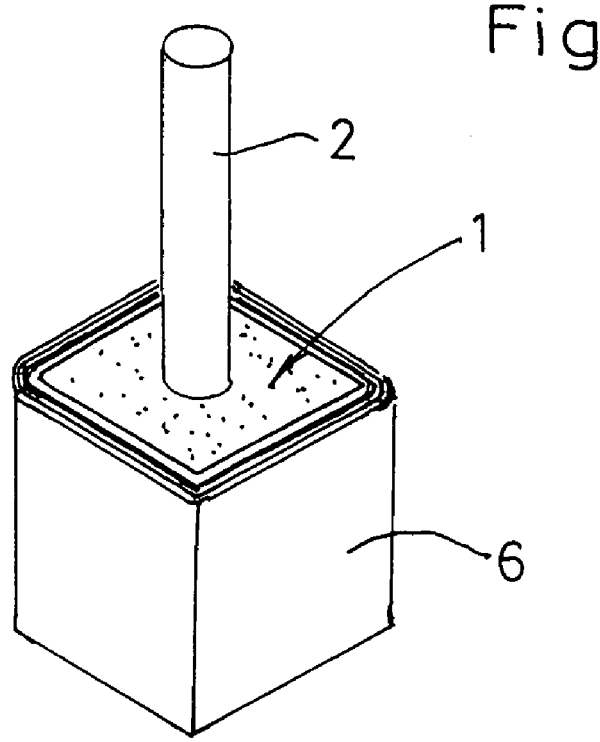
FIG. 17 is a perspective view showing the anode chip of the second embodiment, with a metal layer formed thereon.
Figure 18:
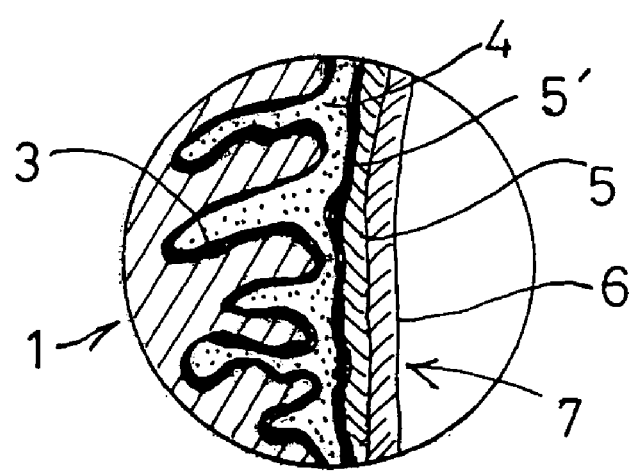
FIG. 18 is an enlarged sectional view showing the surface condition of the chip of FIG. 17.

The anode chip fabrication method of the second embodiment is basically the same as that of the first embodiment, except for the step of forming an intermediate layer between the electrolyte layer 4 and the graphite layer 5. Specifically, first, a compacted anode chip 1 as the one shown in FIG. 1 is prepared, and then a dielectric layer 3 (see FIG. 3) and a first solid electrolyte layer 4 (see FIG. 5) are formed on the chip 1 in the same manner as in the first embodiment. Thereafter, an intermediate layer 5' is formed on the electrolyte layer 4 by application of a graphite solution containing manganese dioxide powder. Specifically, the anode chip 1, with the electrolyte layer 4 formed, is immersed in the $MnO_2$-containing graphite solution and then taken out of the solution for drying at 150–200° C. This immersion-drying process is performed at least once, preferably two or three times. As a result, the intermediate graphite layer 5' shown in FIGS. 13 and 14 is obtained.

Thereafter, as in the first embodiment, a graphite layer 5 and a metal layer 6 are formed in this order on the anode chip 1. Thus, a four-layer cathode 7 is obtained.

In the above method, manganese dioxide powder is to be contained in the intermediate layer 5' flanked by the electrolyte layer 4 and the graphite layer 5. Accordingly, among other physical properties, the intermediate graphite layer 5' has a thermal expansion coefficient generally the same as those of the adjacent layers 4 and 5. Thus, even when the capacitor element is heated, the delamination between the layers 4 and 5 occurs much less frequently than when no such intermediate layer is provided.

According to the present invention, 5–10 wt % of manganese dioxide powder may preferably be contained in the graphite solution used for making the intermediate graphite layer 5'.

The above range for the contained $MnO_2$ is determined based on the results of the experiment conducted by the inventor. The experiment has shown that when the graphite solution contained less than 5 wt % of $MnO_2$ powder, it was substantially impossible to prevent the delamination between the layers 4 and 5. When the graphite solution contained more than 10 wt % of $MnO_2$ powder, on the other hand, the irregularities in the surface of the intermediate graphite layer 5' became too large to be satisfactorily smoothed out by forming the overlapping graphite layer 5 and metal layer 6.

According to the present invention, as described above, it is possible to produce a capacitor element that can maintain the required impedance characteristics even under heated conditions, and can still look good in appearance.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

The invention claimed is:

1. A method of making a capacitor element used for a solid electrolyte capacitor, the method comprising the steps of forming, on an anode chip of valve metal, a dielectric layer, a first solid electrolyte layer of manganese dioxide, a graphite layer and a metal layer in this order, wherein the method further comprises the step of forming a second solid electrolyte layer between the step of forming the first solid electrolyte layer and the step of forming the graphite layer, the second solid electrolyte layer being formed by applying and sintering an aqueous manganese nitrate solution containing a total of 0.5–2.0 wt % of graphite powder.

2. A method of making a capacitor element used for a solid electrolyte capacitor, the method comprising the steps of forming, on an anode chip of valve metal, a dielectric layer, a solid electrolyte layer of manganese dioxide, a first graphite layer and a metal layer in this order, wherein the method further comprises the step of forming a second graphite layer between the step of forming the solid electrolyte layer and the step of forming the first graphite layer, the step of forming the second graphite layer includes applying a graphite solution that contains 5–10 wt % of manganese dioxide powder relative to the solution and drying the applied solution.

3. The method of claim 1, wherein the chip is baked at 200–250° C. after the applying of the aqueous manganese nitrate solution containing graphite powder and before the forming of the graphite layer.

4. The method of claim 2, wherein the chip is dried at 150–200° C. after the applying of the graphite solution containing manganese dioxide powder and before the forming of the first graphite layer.

* * * * *